March 25, 1958 J. W. RIEKE 2,828,414

DEMODULATION OF VESTIGIAL SIDEBAND SIGNALS

Filed Jan. 21, 1953 2 Sheets-Sheet 1

INVENTOR
J. W. RIEKE
BY
[signature]
ATTORNEY

DEMODULATION OF VESTIGIAL SIDEBAND SIGNALS

Filed Jan. 21, 1953 2 Sheets-Sheet 2

INVENTOR
J. W. RIEKE
BY [signature]
ATTORNEY

United States Patent Office 2,828,414

Patented Mar. 25, 1958

2,828,414

DEMODULATION OF VESTIGIAL SIDEBAND SIGNALS

John W. Rieke, Basking Ridge, N. J., assignor to Bell Telephone Laboratories, Incorporated, New York, N. Y., a corporation of New York Application January 21, 1953, Serial No. 332,449

11 Claims. (Cl. 250—27)

This invention relates to communication systems employing modulated carriers and more particularly to receivers for use in such systems.

In the reception of carrier modulated waves, the method of demodulation employed obviously must be chosen with reference to the characteristics of the transmitted wave as determined by the nature of the modulation process. In systems employing amplitude modulation, transmission may be effected by the double sideband, single sideband or vestigial sideband methods. Each of these well-known methods may, under certain circumstances at least, impose definite restrictions upon the type of demodulation apparatus employed.

If, for example, in any of these methods the nature of the modulator is such that the carrier is always less than 100 percent modulated by the signal to be transmitted, the signal information can be recovered at the receiver by envelope detection and even in the vestigial sideband method the signal can be recovered without undesirably large amounts of distortion if the excess carrier ratio is sufficiently great.

If, however, the modulation process employed results in greater than 100 percent modulation of the carrier, envelope detection cannot be employed but the alternative method of product demodulation may be used. As is well known, this type of demodulation requires the supply at the receiver of a carrier wave. In many cases, this carrier wave must be accurately in phase with the carrier employed at the transmitter for modulation by the particular signal which it is desired to transmit. Similarly there are many cases in which product demodulation affords the only practical way of recovering the message signal when vestigial sideband transmission is employed.

When an accurately phased locally generated carrier is essential, errors in the relative phase of the carrier result in undesired distortions of the demodulated signals. The present invention relates to a system for resupplying the carrier wave at the receiver and is disclosed in connection with a vestigial sideband system for the transmission of television and other picture signals although it is equally applicable to other systems of the types referred to above.

The vestigial sideband method of carrier transmission has found considerable application in communication systems over which television or other picture signals are to be transmitted since this method permits transmission of direct current and very low frequency signal components and high utilization of the transmission band available for a particular facility. In such service, however, extremely high transmission requirements must be met to avoid noticeable distortion in the reproduced picture signals.

It is well known that by virtue of shaping in the production of vestigial sideband signals an output signal for transmission is obtained which comprises two components. The first of these, which will be referred to hereinafter as the real or in-phase component, comprises a carrier cos $\omega t$, which is in phase with the steady state carrier applied to the transmitter, modulated by the applied signal information P. The second, which will be referred to as the quadrature component, comprises a carrier sin $\omega t$, which is in quadrature with the steady state carrier, modulated by signal information Q related to the applied signal information P but shifted in phase with respect thereto by 90 degrees and altered in amplitude. The presence of the quadrature component Q sin $\omega t$ in the transmitted wave results in undesirable distortion of the signal information recovered at the receiver unless special circuits are provided to alleviate this effect.

It has been found that such quadrature distortion can be reduced or substantially eliminated if the vestigial sideband signal is subjected to envelope detection and suitable measures such as increasing the amount of carrier signal or the width of the vestigial sideband are employed. However, as has been stated above, the use of envelope detection requires that the transmitted signal have an undesirably large value of excess carrier. This requirement places severe restrictions in systems for the transmission of television signals.

It has also been demonstrated that a vestigial sideband signal having any degree of modulation whatever can be demodulated by product modulation to yield the original video frequency signals without quadrature distortion if the locally generated or resupplied carrier required for this type of demodulation is accurately in phase with the real component of the transmitted signal. The difference in phase between the locally supplied carrier and the real component of the transmitted signal determines the amount of distortion comprising quadrature component which will result in the demodulated signal. The arrangement of the invention is thus particularly advantageous when applied to vestigial sideband systems of this type.

Heretofore, carrier resupply systems for use in product demodulation of modulated signals have not been practical in such applications as picture transmission in which the phase of the resupplied carrier must be the same as that of the carrier at the transmitter to permit satisfactory reproduction of the transmitted information. No practical arrangements have been described for controlling both the phase and frequency of the local oscillator with sufficient accuracy to permit demodulation of picture modulated signals. Consequently this method of demodulation has not found wide acceptance in such systems despite the possibilities which it affords for use in signals having excess carrier ratios less than one and for the elimination of quadrature distortion in vestigial sideband systems.

In view of the above it is the object of the present invention to produce a locally generated carrier wave for use in product demodulation of carrier modulated signals under control of the transmitted wave and without the necessity of transmitting additional control signals.

In accordance with the invention this object is accomplished by providing a control quantity for application to the frequency determinative circuit of the local oscillator which is proportional to the product of the squares of the incoming signal and the output of the local oscillator. Depending upon the application of the resupply circuit of the invention, a phase shift may be introduced into the carrier resupply circuit so that the locally generated carrier may be held accurately in phase with that component of the transmitted wave which it is desired to recover. Thus if two messages are transmitted simultaneously by the method employing carriers of the same frequency which are in quadrature with one another, the amount of phase adjustment required will depend upon which signal is to be recovered by the particular demodulator.

In the receiver for vestigial sideband signals described by way of example herein, it is desired to eliminate quadrature distortion. This is accomplished, as pointed out above, by adjusting the phase of the locally generated carrier to correspond to that of the real or in-phase carrier of the transmitted wave.

The above and other features of the invention will be described in detail in the following specification taken in connection with the drawings in which.

Figure 1:
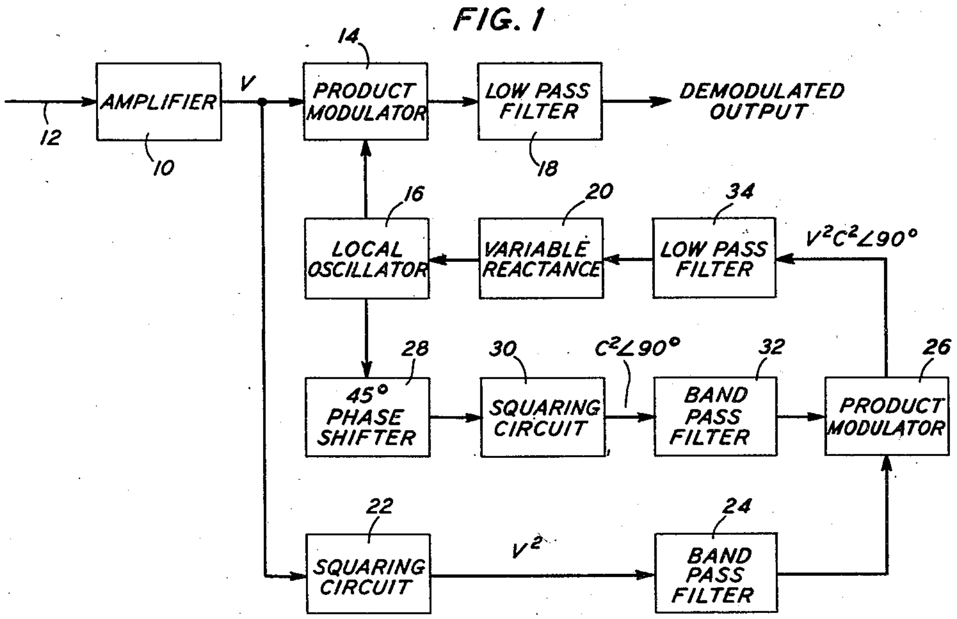
Fig. 1 is a single line block schematic diagram of a receiver for vestigial sideband signals including carrier resupply circuits in accordance with the invention.

It will be recalled that in accordance with the invention the local oscillator, by means of which a carrier current is generated for application with the received signal to a product modulator, is controlled as to frequency by a quantity derived from the transmitted wave and from the output of the local oscillator in such a way that the output of the local oscillator is accurately in phase with the real or in-phase portion of the transmitted wave. It is under these circumstances that the output of the product modulator employed for demodulation contains no components corresponding to quadrature distortion. The local oscillator with its frequency determininative element thus forms the controlled element of a servo system the error signal for which is derived from the incoming wave and the oscillator output. This error signal, which is representative of the difference in phase between the local oscillator output and the real part of the incoming wave, is required to vary the frequency of the local oscillator in the appropriate sense and to the proper extent to maintain the desired phase relationship as the phase of the local oscillator output varies because of frequency drift and like causes.

Since the error signal is derived in part from the transmitted wave which is modulated by message signal information and may change polarity in accordance therewith, it is necessary to provide some means for eliminating the corresponding phase reversals which would render the servo control system unstable. It has been found that if both components from which the error signal is derived are squared and the two are multiplied together according to the invention after a phase shift of 90 degrees has been introduced as set forth above the resultant error signal will vary as the sine of twice the error angle. This signal is suitable for servo control since it has a value of zero for zero error angle and increases in the proper sense to introduce a correcting influence regardless of the direction in which the phase of the local carrier varies with respect to the phase of the real part of the incoming signal. Further, since the incoming signal information is squared in the process of producing the error signal, time variable polarity ambiguities are eliminated, the square always being of the same polarity.

Whenever the transmitted signal is first applied to the receiver it is equally probable that the local carrier will be in phase or 180 degrees out of phase as compared with the transmitted carrier since the squaring process employed produces the same control signal for either polarity of steady state carrier. This condition does not vary with the modulating wave, however, and can be remedied by a simple reversing switch or the equivalent in the demodulated wave output circuit.

Typically the transmitted vestigial sideband signal V may be written as follows:

$$V=P\cos\omega t+Q\sin\omega t \qquad (1)$$

where P and Q are respectively the in-phase and quadrature modulating coefficients and $\omega$ is the angular frequency of the carrier wave applied at the transmitter. Similarly the output of the local oscillator C may be written $$C=\cos(\omega t+\varphi) \qquad (2)$$

where $\varphi$ represents the phase difference between the local carrier and the carrier employed at the transmitter and may be referred to as the error angle. The low frequency terms from the product of V and C may be written as follows:

$$V\times C=\tfrac{1}{2}(P\cos\varphi-Q\sin\varphi) \qquad (3)$$

Equation 3 represents the useful output from the product demodulator of the receiver. It is apparent that if the error angle $\varphi$ is equal to zero the quadrature component, $Q\sin\varphi$, vanishes, leaving only the desired in-phase component.

It will be recalled that for the vestigial sideband system chosen for illustration, the required control quantity is proportional to $V^2C^2\angle 90°$. This may be evaluated as follows, writing only the high frequency terms of $V^2$ and $C^2$.

$$V^2=\frac{P^2-Q^2}{2}\cos 2\omega t+PQ\sin 2\omega t \qquad (4)$$

$$C^2=\frac{1}{2}(\cos 2\omega t+2\varphi) \qquad (5)$$

While either $V^2$ or $C^2$ may be shifted in phase, $C^2$ will be used for purposes of illustration. Thus $$C^2\angle -90°=\frac{1}{2}(\sin 2\omega t\cos 2\varphi+\cos 2\omega t\sin 2\varphi) \qquad (6)$$

and the low frequency terms of the quantity $V^2C^2\angle -90°$ may be written $$V^2C^2\angle -90°=\frac{1}{4}\left[\frac{P^2-Q^2}{2}\sin 2\varphi+PQ\cos 2\varphi\right] \qquad (7)$$

If this quantity is averaged over a long interval by a very low-pass filter, voltage fluctuations produced by the term $PQ\cos 2\varphi$ approach zero and $$V^2\times C^2\angle -90°=\frac{1}{8}\overline{(P^2-Q^2)}\sin 2\varphi \qquad (8)$$

where $\overline{P^2-Q^2}$ is the average valve of $P^2-Q^2$. Since in double sideband or vestigial sideband signals the average value of $P^2$ is always greater than the average value of $Q^2$, the quantity $\overline{P^2-Q^2}$ is greater than zero for all modulating signals. Accordingly this quantity, $\overline{(P^2-Q^2)}\sin 2\varphi$, is that required for control of the local oscillator, inasmuch as it depends only upon the square of the applied signal information and the error angle as pointed out above.

Figure 4:
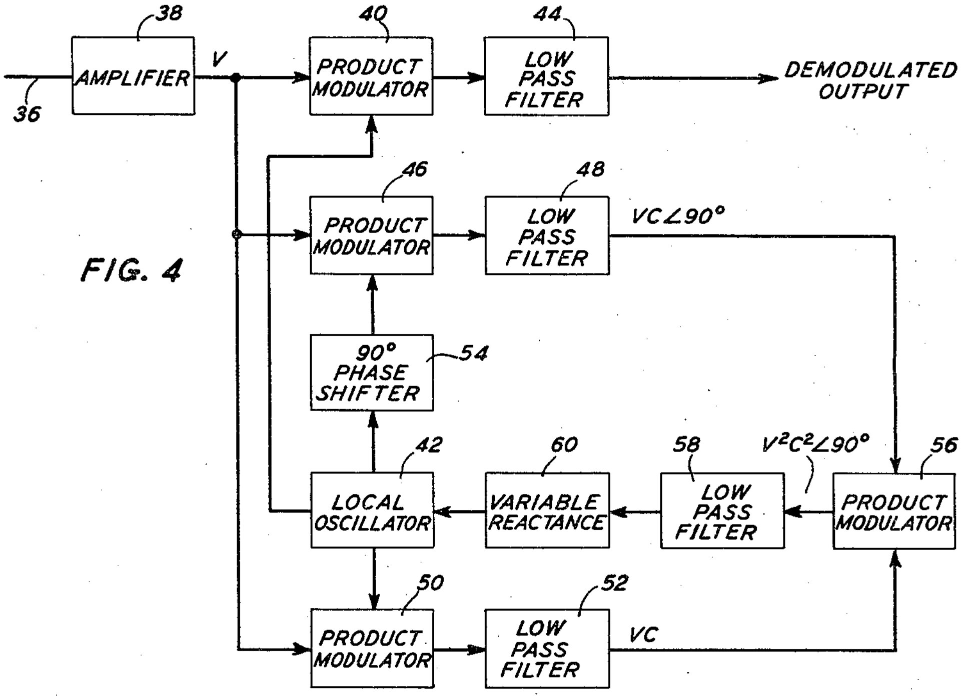
Figs. 4 and 5 are block diagrams of alternative receiver circuits according to the invention.
Figure 5:
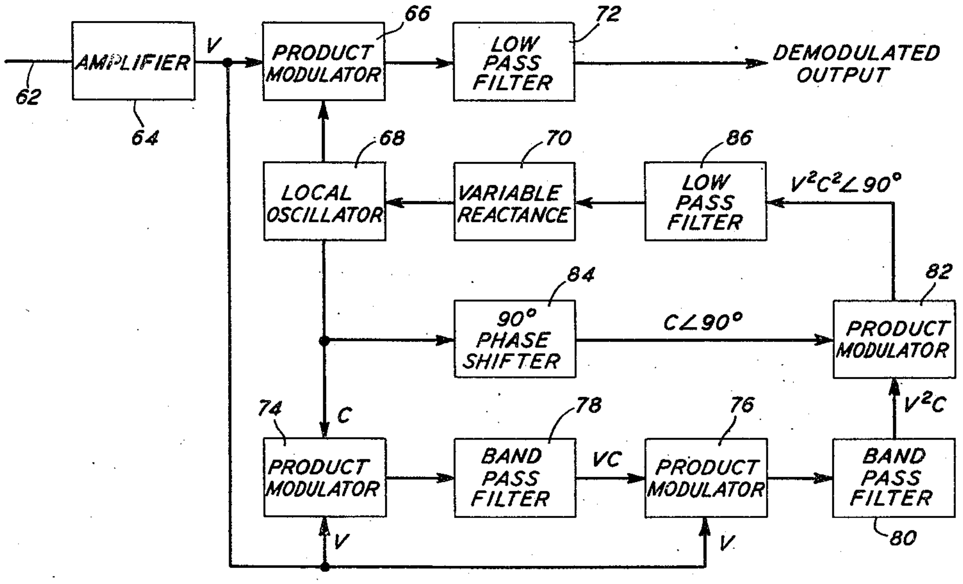

It will be recognized from the above that the product $V^2C^2\angle 90°$ may be obtained in a variety of ways differing in the order in which the several mathematical operations are performed by the electrical apparatus. The block diagrams of Figs. 1, 4 and 5 illustrate typical embodiments in which this quantity is obtained by multiplying together the transmitted wave and the output of the local oscillator in various ways, the necessary 90-degree phase shift also being introduced in the process. This phase shift may be accumulated in many parts of the circuits to effect the desired result.

In the arrangement of Fig. 1, the quantity $V^2C^2\angle 90°$ is obtained by squaring the input signal V, shifting the phase of the local oscillator output by 45 degrees and squaring the resultant quantity to obtain $C^2\angle 90°$ and then multiplying $C^2\angle 90°$ by $V^2$. The receiver embodying the invention in this form comprises a high frequency amplifier 10 to which is applied the transmitted signal over input lead 12. The output of the amplifier comprises the transmitted wave which has both real or in-phase and quadrature components. This wave constitutes the quantity as defined in Equation 1 above. This output is applied to a product modulator 14 together with the output C of a local oscillator 16, this arrangement being that commonly employed for product demodulation.

Local oscillator 16 normally operates at a frequency equal to the carrier frequency employed at the transmitter of the system and its output C is defined by Equation 2 above. The tuned circuit of the oscillator includes a variable element, normally a reactance 20, which is determinative of the operating frequency and the oscillator is designed to possess stability commensurate with that of the transmitter oscillator. In one arrangement, for example, oscillator 16 comprises a crystal oscillator, the tuned circuit of which includes in addition to the crystal a variable capacitor for manual tuning of the oscillator and a variable reactance comprising a coil, the reactance of which may be adjusted by varying the amount of current flowing in an auxiliary coil.

Figure 3:
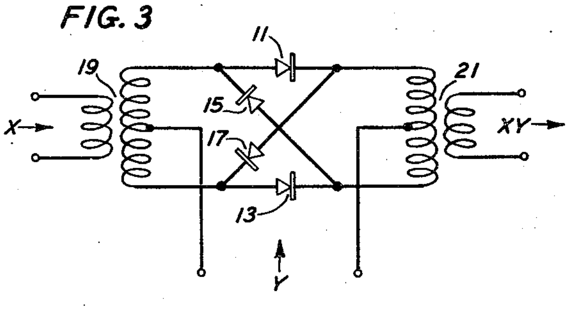
Fig. 3 is a schematic diagram of the product modulators shown in Fig. 1.

Assuming that the local oscillator 16 is accurately in phase with the real component of the transmitted wave V, the modulation products of product modulator 14 will include the applied signal wave and will not include any terms corresponding to the quadrature component received from the antenna over lead 12. A low-pass filter 18 is connected in the output of the product modulator 14 to recover the signal wave in the usual manner. Product modulator 14 may be of any desired type and may for example comprise a ring modulator as shown in Fig. 3 including varistors 11, 13, 15, 17 and transformers 19 and 21 and operating as described in the article entitled "Copper oxide modulators in carrier telephone systems," by R. S. Caruthers, published in The Bell System Technical Journal for April 1939, at page 317. If input signals X and Y are applied to the circuit of Fig. 3 as indicated the product of the amplitudes of these quantities will be included in the output XY produced across the remaining terminals of the circuit.

The remaining elements of the circuit disclosed in Fig. 1 are required for adjusting the frequency of the local oscillator in such a way as to obtain the desired phase relationship between its output and the received signal wave and according to the invention provide means for varying the reactance of variable reactor 20 associated with oscillator 16 in accordance with variations in the quantity $(P^2-Q^2)\sin 2\varphi$ where, it will be recalled, $\varphi$ is the error angle and represents the difference in phase between the output of oscillator 16 and the real part of the received signal V.

For the purpose of obtaining the requisite control signal which is proportional to $V^2C^2\angle 90°$, the output of amplifier 10 is also applied to a squaring circuit 22, the output of which may be expressed simply as $V^2$.

Figure 2:
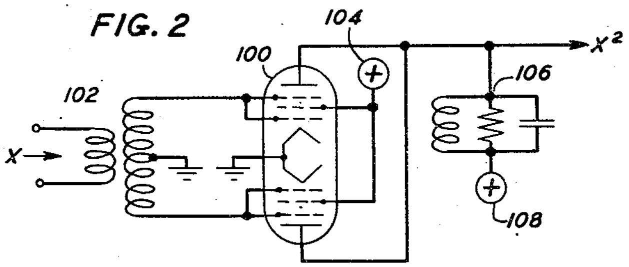
Fig. 2 is a circuit diagram of the squaring circuit shown in Fig. 1.

While squaring circuit 22 may be of any convenient type, a suitable circuit for performing the squaring operation is shown in Fig. 2 of the drawings. This circuit comprises a dual-pentode type tube 100, the cathodes of which are connected together and to ground. The quantity X to be squared is applied in push-pull relationship to the control grids of the two sections of tube 100 through an input transformer 102, the secondary winding of which is provided with a grounded center-tap. The suppressor grids are connected to the control grids to enhance the square law characteristic while the screen grids are connected together and to the source of a positive potential with respect to ground indicated at 104. The anodes of the two sections of the tube are connected together and through a tuned load circuit 106 to the source of a positive potential with respect to ground indicated at 108. It can be shown that the quantity appearing across load circuit 106 is accurately proportional to $X^2$.

The output of squaring circuit 22, Fig. 1, is applied to a band-pass filter 24 (load circuit 106 of Fig. 2) which is tuned to reject all frequency components except those corresponding to twice the angular frequency of the transmitted carrier and the corresponding modulation sidebands. The output of the band-pass filter is applied as one input of a product modulator 26.

In addition, an output obtained from local oscillator 16 is applied to a 45-degree shifter 28 which may be of any conventional type. A simple RC or LC circuit will be satisfactory in this application inasmuch as the quantity applied to the phase shifter is essentially a single frequency wave. The output of phase shifter 28 is proportional to $C\angle 45°$ and this is applied to a second squaring circuit 30 which may be identical to squaring circuit 22 and which provides an output to $C^2\angle 90°$. This quantity is applied to a band-pass filter 32 which may be identical to band-pass filter 24 and which is arranged to provide the same pass band. The output of this filter is applied as a second input to product modulator 26. Product modulator 26 may be of the same type as product modulator 14 included in the signal circuit and may operate in the same way.

In the arrangement of Fig. 1 the output of product modulator 26 is then proportional to $V^2C^2\angle 90°$ as indicated. This quantity is applied through a low-pass filter 34 to control variable reactance 20. It will be recalled that the quantity applied to low-pass filter 34 is proportional essentially to $P^2-Q^2 \sin 2\varphi + PQ \cos 2\varphi$. Low-pass filter 34 is chosen to attenuate the term $PQ \cos 2\varphi$ sufficiently to prevent interference with the control circuit. Low-pass filter 34, in addition, must be chosen in accordance with well-known principles of feedback amplifier design to prevent oscillation of the control circuit.

It will be noted that the control system essentially responds to any phase difference indicated by the output of product modulator 26. It is obvious, therefore, that the phase of the locally generated carrier C and that of the output of amplifier 10 must be preserved in the branches through which these respective quantities are applied to the inputs of the product modulator 26. Any shifts in the phase of either of these quantities in these portions of the control circuit will result in erroneous adjustment of oscillator 16 and consequent distortion in the demodulated wave obtained in the output of low-pass filter 18.

In the arrangement of Fig. 4 the quantity $V^2C^2\angle 90°$ required for control of the frequency of the local oscillator is obtained by multiplying the output of the local oscillator by the incoming signal in each of two channels. In the first of the channels, the output of the local oscillator is shifted in phase by 90 degrees and the resultant quantities, namely $VC\angle 90°$ and VC are finally multiplied together. As in the circuit of Fig. 1, the incoming wave from the transmission facility on lead 36 is applied through an amplifier 38 to a product modulator 40 to which is also applied the resupplied carrier wave from local oscillator 42. A low-pass filter 44 connected in the output of product modulator 40 selects the desired modulation product corresponding to the message wave.

The output wave from local oscillator 42 is adjusted in phase to correspond to the real part of the incoming signal V by a control system involving two similar branch circuits. The first of these includes a product modulator 46 and a low-pass filter 48, while the other includes a similar product modulator 50 and a low-pass filter 52. The incoming wave which is made available at the output of amplifier 38 is applied to each of product modulators 46 and 50, to each of which is also applied the output wave from local oscillator 42. In the case of product modulator 50, the locally generated carrier is applied directly, while in the case of product modulator 46 the locally generated carrier is subjected to a phase shift of 90 degrees by passage through a phase shifter 54 connected between local oscillator 42 and the product modulator.

It will be recognized that the quantity appearing at the output of low-pass filter 48 is proportional to $VC\angle 90°$ while that appearing at the output of the corresponding low-pass filter 52 is equal simply to VC. Low-pass filters 48 and 52 are designed to reject frequencies of twice the carrier frequency and the corresponding sidebands but to pass lower frequencies.

The two quantities available at the outputs of the low-pass filters are multiplied together by a third product modulator 56 to obtain the quantity $V^2C^2\angle 90°$, the low frequency components of which are abstracted by a low-pass filter 58 and applied to control a variable reactance 60 which forms a portion of the tuned circuit of local oscillator 42. It will be understood that operation of the control circuit of Fig. 4 is entirely analogous to that of Fig. 1, the only differences being in the manner in which the required control quantity proportional to $(P^2-Q^2)\sin 2\varphi$ is obtained from the information included in the incoming wave V.

A second modification of the carrier resupply system of Fig. 1 is shown in Fig. 5. In this arrangement the incoming wave is multiplied by the locally generated carrier and the resulting product multiplied by the incoming wave again to obtain the quantity $V^2C$. This quantity is in turn multiplied by the output of the local oscillator C after a phase shift of 90 degrees has been introduced therein to obtain the identical control quantity $V^2C^2\angle 90°$. In the circuit arrangement the output of the transmission facility on lead 62 is applied through a radio frequency amplifier 64 to a product modulator 66 to which is also applied the output of a local oscillator 68, the tuned circuit of which includes a variable reactance 70. The message wave modulation product from product modulator 66 is selected by a low-pass filter 72 and appears as the demodulated output. The incoming signal wave is in addition applied to product modulators 74 and 76. The output of the local oscillator is applied as a second input to product modulator 74, the output of which is abstracted through a band-pass filter 78 tuned to accept components having frequencies equal to twice the carrier frequency and the corresponding sidebands. The output of band-pass filter 78 is proportional to the quantity VC. This quantity is applied as a second input to product modulator 76, the output of which is passed through a band-pass filter 80 which is arranged to accept components having frequencies equal to the carrier frequency and the corresponding sidebands and provides an output proportional to the quantity $V^2C$.

The desired control signal is obtained from the output of band-pass filter 80 by multiplication in a product modulator 82 by the quantity $C\angle 90°$ which is conveniently obtained from local oscillator 68 by passing a portion of its output wave through a 90-degree phase shifter 84. The output of product modulator 82 will be understood to be proportional to the desired control quantity $V^2C^2\angle 90°$, the desired low frequency component of which is abstracted by a low-pass filter 86 for application to the variable reactance 70 to control the frequency of local oscillator 68 in the manner described above in connection with the other embodiments of the invention.

What is claimed is:

1. In a receiver for carrier modulated signals a demodulator for said signals of the type requiring a locally supplied carrier wave, a local oscillator for supplying said carrier wave and having a variable element determinative of its operating frequency and means for adjusting said oscillator to produce an output wave which is accurately in phase with a desired component of said signals comprising means responsive to said signals and to the output of said oscillator for deriving therefrom a quantity proportional to the square of the product thereof and means for applying at least some portion of said quantity to said variable element to control the frequency of said oscillator, said last mentioned means including means for averaging said portion prior to application thereof to said variable element.

2. In a receiver for vestigial sideband signals, a demodulator for said signals of the type requiring a locally supplied carrier wave, a local oscillator for supplying said carrier wave and having a variable element determinative of its operating frequency and means for adjusting said oscillator to produce an output which is accurately in phase with the real part of said signals comprising means for deriving from said signals and the output of said oscillator two quantities which are shifted in phase by 90 degrees with respect to each other, means for producing from said quantities a third quantity proportional to the square of the product thereof and means for applying at least a portion of said third quantity to said variable element to control the frequency of said oscillator, said last mentioned means including means for averaging said portion prior to application thereof to said variable element.

3. In a receiver for carrier modulated signals having excess carrier ratios less than one, a product modulator accepting said signals and a locally supplied carrier wave and arranged to demodulate said signals, an oscillator for supplying said carrier waves and having a reactance element in the frequency determinative circuit to adjust the tuning of said oscillator in response to an applied current and means applying a variable current to said reactance element to control said oscillator for the production of a carrier output which is accurately in phase with a desired carrier component of said signals, comprising means responsive to said signals and to the output of said oscillator for deriving therefrom a quantity proportional to the square of the product thereof and means for applying said product to said reactance element and including a low-pass filter arranged to average said product prior to its application as a control to the oscillator.

4. In a demodulator for vestigial sideband signals a local oscillator having a variable element determinative of its operating frequency, a product modulator, means for applying a received vestigial sideband signal and the output of said local oscillator to said modulator to produce a demodulated output wave, and means for adjusting said local oscillator to produce a carrier which is accurately in phase with the carrier for said signal comprising means for deriving from said received signal a first quantity equal to the square thereof, means for deriving from said local oscillator a second quantity equal to the square of its output shifted in phase by 90 degrees, means for deriving from said quantities a third quantity equal to the product thereof and means for applying the average of the low frequency components of said third quantity to said variable element as a control signal.

5. In a receiver for vestigial sideband signals, a demodulator for said signals of the type requiring a locally supplied carrier wave, a local oscillator for supplying said carrier wave and having a variable element determinative of its operating frequency and means for adjusting said oscillator to produce a wave output which is accurately in phase with the real part of said signals, comprising means for squaring said signal, means for squaring the output of said oscillator, means for shifting the phase of one of the squared quantities by 90 degrees, means for obtaining the product of the output of said phase shifting means and the other squared quantity and means for applying the average of the low frequency components of said product to said local oscillator as a control signal to adjust the frequency thereof.

6. In a receiver for vestigial sideband signals, a demodulator for said signals of the type requiring a locally supplied carrier wave, a local oscillator for supplying said carrier wave and having a variable element determinative of its operating frequency and means for adjusting said oscillator to produce a wave output which is accurately in phase with the real part of said signals comprising means for shifting the phase of the output of said local oscillator by an angle of 45 degrees, means for squaring the phase-shifted output of said local oscillator, means for squaring said signals, a product modulator, means for applying the outputs of each of said squaring means as input signals for said modulator and means for applying the product output of said modulator to said element to control the frequency of said local oscillator, said last mentioned means including means for averaging said portion prior to application thereof to said variable element.

7. In a receiver for vestigial sideband signals, a demodulator for said signals of the type requiring a locally supplied carrier wave, a local oscillator for supplying said carrier wave and having a variable element determinative of its operating frequency and means for adjusting said oscillator to produce a wave output which is accurately in phase with the real part of said signals, comprising means for squaring the output of said local oscillator and shifting its phase by 90 degrees with respect to said signals, means for squaring said signals, a product modulator, means for applying as inputs to said modulator only those components of the outputs of each of said squaring means corresponding to twice the carrier frequency of said signals and the corresponding sidebands and means for applying the output of said product modulator to said control element, said last-mentioned means including means for averaging the value of said product.

8. In a receiver for vestigial sideband signals, a demodulator for said signals of the type requiring a locally supplied carrier wave, a local oscillator for supplying said carrier wave and having a variable element determinative of its operating frequency and means for adjusting said oscillator to produce a wave output which is accurately in phase with the real part of said signals, comprising a pair of channels accepting said signals and each including a product modulator and a low-pass filter arranged to reject components having twice the carrier frequency of said signals and the corresponding sidebands, means for applying to each of said product modulators the output of said local oscillator, the output applied to one of said modulators being shifted by 90 degrees with respect to that applied to the other, means for applying the signal to said modulators, means for obtaining the product of the outputs of said low-pass filters and means for applying the average of the low frequency components of said product to said variable element as a control signal and carrier for said oscillator.

9. In a receiver for vestigial sideband signals, a demodulator for said signals of the type requiring a locally supplied carrier wave, a local oscillator for supplying said carrier wave and having a variable element determinative of its operating frequency and means for adjusting said oscillator to produce a wave output which is accurately in phase with the real part of said signals, comprising means for obtaining the product of said signal and the output of said local oscillator in a first branch circuit, means in a second branch circuit for introducing a phase difference of 90 degrees between said signal and the output of said local oscillator and obtaining the product thereof, means for obtaining the product of the outputs of said first and second branch circuits and means for applying the average of the low frequency components of said product to said variable element as a control signal for said oscillator.

10. In a receiver for vestigial sideband signals, a demodulator for said signals of the type requiring a locally supplied carrier wave, a local oscillator for supplying said carrier wave and having a variable element determinative of its operating frequency and means for adjusting said oscillator to produce a wave output which is accurately in phase with the real part of said signals, comprising means for accepting the output of said local oscillator and said signal and producing an output proportional to the product thereof, means for accepting the product output and said signal and producing a second output proportional to the product thereof, means for shifting the phase of the output of said local oscillator by 90 degrees and means for accepting the output of said phase shifting means and said second product output and producing an output proportional to the average of the low frequency components of the product thereof for application to said element as a control signal for said oscillator.

11. In a receiver for vestigial sideband signals, a demodulator for said signals of the type requiring a locally supplied carrier wave, a local oscillator for supplying said carrier wave and having a variable element determinative of its operating frequency and means for adjusting said oscillator to produce a wave output which is accurately in phase with the real part of said signals, comprising a first product modulator, means for applying the output of said local oscillator and said signal thereto to obtain a first output proportional to the product thereof, a second product modulator accepting said first output and said signal and producing a second output proportional to the product thereof and a third product modulator accepting said second product output and the output of said local oscillator shifted in phase by an angle of 90 degrees to produce a third product output for application to said element as a control signal for said oscillator, said last mentioned means including means for averaging the low frequency components of said third product.

References Cited in the file of this patent

UNITED STATES PATENTS

| | | |
|---|---|---|
| 2,041,855 | Ohl | May 26, 1936 |
| 2,066,528 | Harper | Jan. 5, 1937 |
| 2,171,678 | Weyers | Sept. 5, 1939 |
| 2,231,704 | Curtis | Feb. 11, 1941 |
| 2,268,998 | Bay | Jan. 6, 1942 |
| 2,453,988 | Guanella | Nov. 16, 1948 |
| 2,525,089 | Blumlein | Oct. 10, 1950 |
| 2,540,333 | Hugenholtz | Feb. 6, 1951 |